July 24, 1934.  F. W. MILLER  1,967,477
WATER GAUGE ILLUMINATOR
Filed Sept. 28, 1931  2 Sheets-Sheet 1
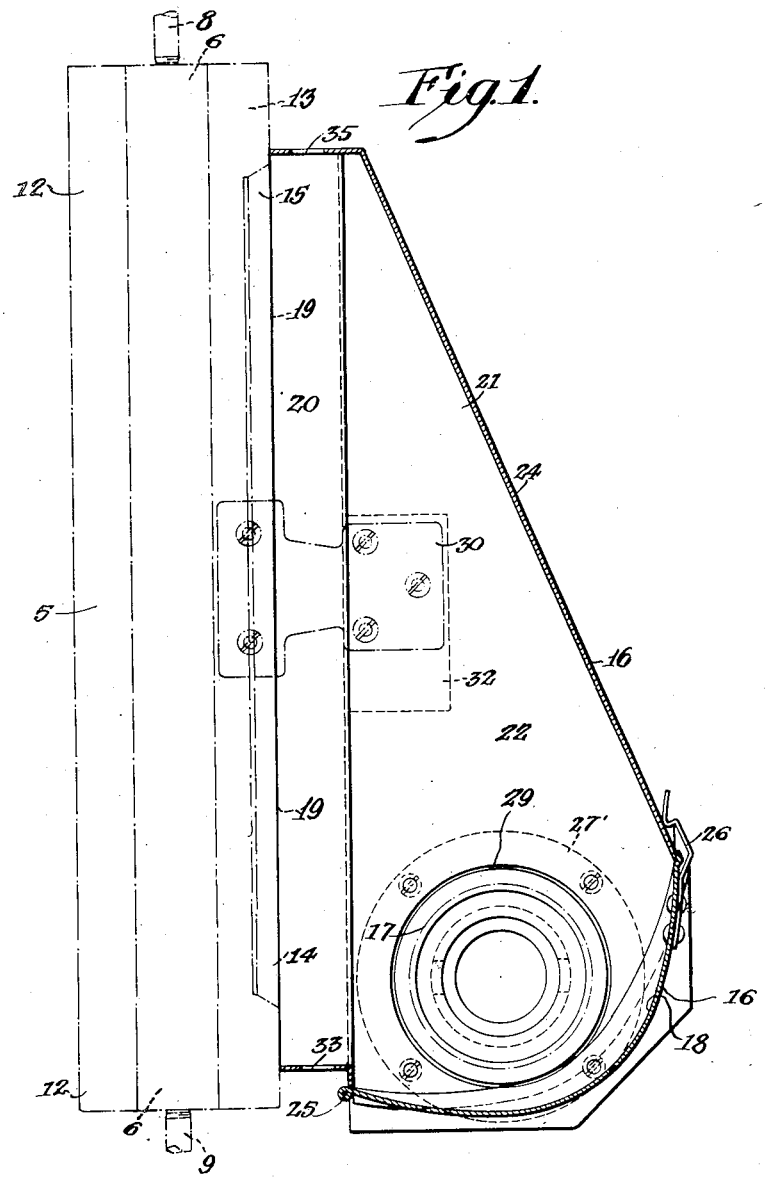
Witnesses:
Geo L Jepson
Walter Chism
Inventor
Frank W. Miller
by Stull Jackson and Son
Attorneys

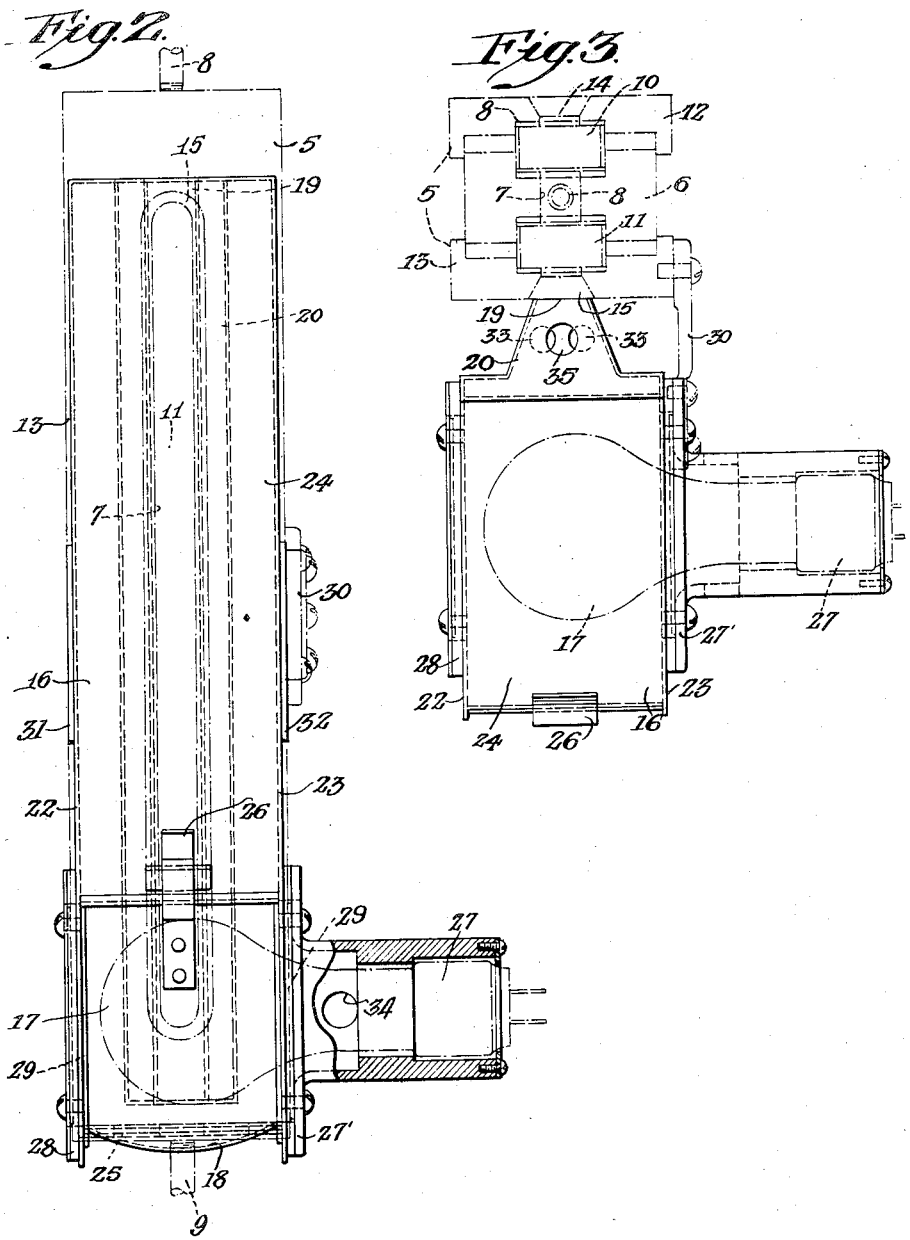

Patented July 24, 1934

1,967,477

UNITED STATES PATENT OFFICE 1,967,477

WATER GAUGE ILLUMINATOR

Frank W. Miller, Philadelphia, Pa., assignor to Yarnall-Waring Company, Philadelphia, Pa., a corporation of Pennsylvania Application September 28, 1931, Serial No. 565,491

5 Claims. (Cl. 240—2.15)

My invention relates to an illuminator for water gauges, being particularly adapted to use with gauges of the flat glass type such as are frequently used to indicate the water levels within high pressure boilers. These gauges present a water column to vision from the front and to illumination from the rear, usually through vertical slot openings in front and rear metal plates of the gauge.

A purpose of the invention is to provide a water gauge illuminator of the character indicated adapted to easy and inexpensive manufacture and well suited to the needs of service.

A further purpose is to provide uniform illumination upon the rear of a gauge column of the character indicated, and from a light bulb out of sight of the users of the gauge.

A further purpose is to locate an electric bulb low down and to the rear of a gauge of the character indicated and to uniformly reflect light from the bulb diagonally upwardly into the rear of the gauge column.

A further purpose is to provide an illuminator of the character indicated with a light absorbent interior surface except at a reflector directing the light from a light bulb upon the gauge column.

A further purpose is to provide an illuminator of the character indicated with a light socket selectively on either side of a box portion of the illuminator and with bracket connection to the gauge selectively from the said either side.

A further purpose is to provide an illuminator of the character indicated with a combined reflector and door.

Further purposes will appear in the specification and in the claims.

I have elected to show one only of the many different forms of my invention, selecting however a form that is practical and efficient in operation and which well illustrates the principles involved.

Figure 1 is a sectional elevation of an illuminator embodying a preferred form of the invention, shown applied to a gauge glass that is indicated in dot-and-dash lines as a flat glass type of gauge but which is intended for a conventional illustration of any gauge to which the invention is adapted to be applied.

Figure 2 is a left side elevation of the structure shown in Figure 1, partly sectioned.

Figure 3 is a top plan view of the structure shown in Figures 1 and 2.

Like numerals refer to like parts in all figures.

Describing in illustration and not in limitation and referring to the drawings:—

The illuminator embodying the present invention is believed to have its best and widest application with water gauges of the flat type in which the column is open to view from the front, usually through a slot of a metal front plate of the gauge, and open to illumination at the back through a correspondingly slotted back plate.

The flat gauge 5 may include a body 6 normally of metal having a vertical slot 7 forming side walls of the water column, high and low connections, as from a boiler, into the top and bottom of the slot at 8 and 9 respectively, heavy glass plates 10 and 11 closing the slot at front and rear respectively and the front and back metal plates 12 and 13 vertically slotted in registry with the slot 7 of the body and bolts or screws, not shown, clamping the plate members all together.

It will be seen that the gauge column is open to vision from the front through the slot 14 and glass plate 10 and open to illumination at the rear through the slot 15 and the glass plate 11, and the present invention is directed to an illuminator for effectively lighting up the rearward side of the gauge column, as through the slot opening 15, and from a light bulb located out of sight of users of the gauge.

The illustrated embodiment of the invention includes a box 16, a light bulb 17, and a light reflector 18, the box suitably of sheet metal having a vertical opening 19 for presentation to the gauge column and preventing outward transmission of light from the bulb except at the opening 19, the bulb being located near the bottom of the outlet and suitably rearwardly thereof, and the reflector being curved to uniformly illumine the outlet 19 by reflected light from the bulb.

The opening 19 to the gauge is normally narrow as compared to the length of a light bulb and the box 16 for this reason suitably includes forward and rearward portions 20 and 21 respectively, the forward portion 20 comprising a horizontally tapering approach to the opening 19 and the rearward portion 21 having parallel vertical sides 22 and 23, a forwardly and upwardly tapering rear or back 24 and the light reflector 18 as a bottom adapted to open as a door, being hinged at 25 and normally held closed by a suitable catch 26.

The socket 27 holding the bulb is carried in a flanged mount 27' that is fastened interchangeably with a removable cover 28 upon respective sides of the box, the socket mount 27' closing one side opening 29 while the flange 28 closes the other.

It will be seen electrical connections to the illuminator may be thus made equally well from either side.

The box itself is suitably supported from the gauge by a bracket 30 interchangeably mounted on either side of the box as from either one of two side plates 31 and 32, and for interchangeable connection to either side of the gauge.

The combined door and reflector may be suitably formed of light copper sheet with the inner surface chromium plated and brightly polished, and should have a curvature adapting its reflecting inner surface to best illumine the opening 19 to the gauge.

The interior surfaces of other portions of the box are preferably made non-reflecting.

As a result the illuminator is found to give wonderfully effective illumination of the column throughout its length with a bright line at the meniscus.

The box is frequently desirably provided with one or more openings near the bottom as at 33 and 34 and one or more openings at the top as at 35 to provide air circulation and thereby prevent any undue heating of the box.

It will be evident that the light traveling diagonally upwardly and forwardly from my illuminator to ultimately reach the eye of an observer diagonally downwardly and forwardly from the gauge, has been refracted, bent somewhat forward at the rearward or outside surface of the back glass plate, again refracted, bent somewhat upwardly, at the forward surface of the back plate, totally reflected diagonally downward and forward at the meniscus, refracted, bent somewhat forward, at the rearward surface of the front glass plate, and again refracted, bent somewhat downward at the forward surface of the front glass plate.

The phenomenon of total reflection takes place at the separating surfaces of contiguous transparent media of different densities, a ray of light traveling in the denser medium (here water) to impinge upon the separating surface (here the meniscus between the water and steam) being totally reflected back into the denser medium (here back into the water) when the angle of incidence that the ray makes with the separating surface is too great for the passage of the ray out of the denser into the less dense medium.

The meniscus convexly curves downwardly and as a result, the angles of incidence of the light rays that impinge upon the meniscus are progressively variant at successive points of the curve causing the beam totally reflected from the meniscus forwardly and downwardly to widely diverge thereby making the meniscus clearly visible from below at widely divergent points.

Wherever the observer stands, within a quite large range of position, he can see the meniscus as a bright line, light from the illuminator being totally reflected at this line into the eye of the observer.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. An illuminator including a box having a non-reflecting interior and having a vertical opening to register with the rearward side of a gauge glass of the character indicated, the opening being unobstructed from top to bottom, and a light within a low portion of the box directing illumination diagonally upwardly upon the opening.

2. An illuminator including a box having a vertical opening to register with the rearward side of a gauge of the character indicated, the opening being unobstructed from top to bottom, a light within a low portion of the box and a concave reflector diagonally downwardly from the light so as to be entirely below and immediately back of the light, the light and reflector directing the illumination diagonally upwardly upon the opening along the length thereof and the box having an interior surface unadapted to reflect light except at the reflector.

3. An illuminator including a box having a non-reflecting interior and having a vertical opening to register with the rearward side of a gauge of the character indicated, the opening being unobstructed from top to bottom, a light within a low portion of the box and a reflector diagonally downwardly from the light so as to be entirely below and immediately back of the light, the light and reflector directing the illumination diagonally upwardly upon the opening along the length thereof, and the reflector comprising also a door into the interior of the box.

4. An illuminator including a box having a non-reflecting interior and having a vertical opening to register with the rearward side of a gauge of the character indicated, the opening being unobstructed from top to bottom, a light within a low portion of the box and a reflector diagonally downwardly from the light so as to be entirely below and immediately back of the light, the light and reflector directing the illumination diagonally upwardly upon the opening along the length thereof, and a bracket mounted interchangeably upon opposite sides of the box for supporting connection to either side of a gauge.

5. In a liquid level gauge, walls confining the liquid column, having translucent portions on opposite sides of the column, a box having non-reflecting upper walls and open and entirely unobstructed for a vertical distance corresponding to the height of a translucent portion along a side toward the translucent portion, a source of light in the bottom of the box and a movable closure for the bottom of the box having a reflecting surface and concave in planes through the liquid column and at right angles to these planes.

FRANK W. MILLER.